March 2, 1954 — H. SCHMIEGE — 2,670,747
VEHICLE MOUNTED PORTABLE TENT
Filed May 9, 1952 — 3 Sheets-Sheet 1
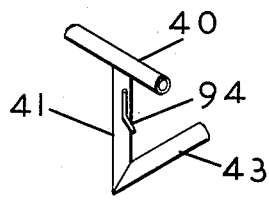
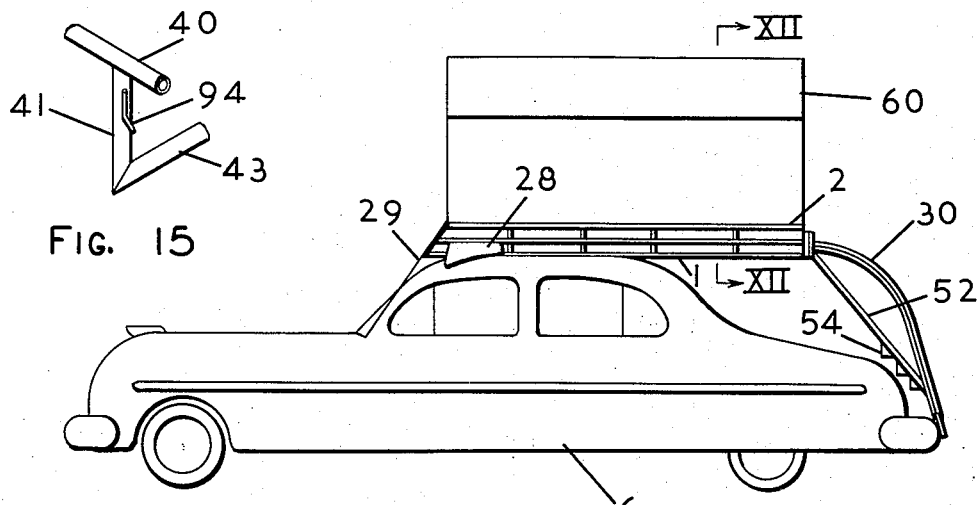
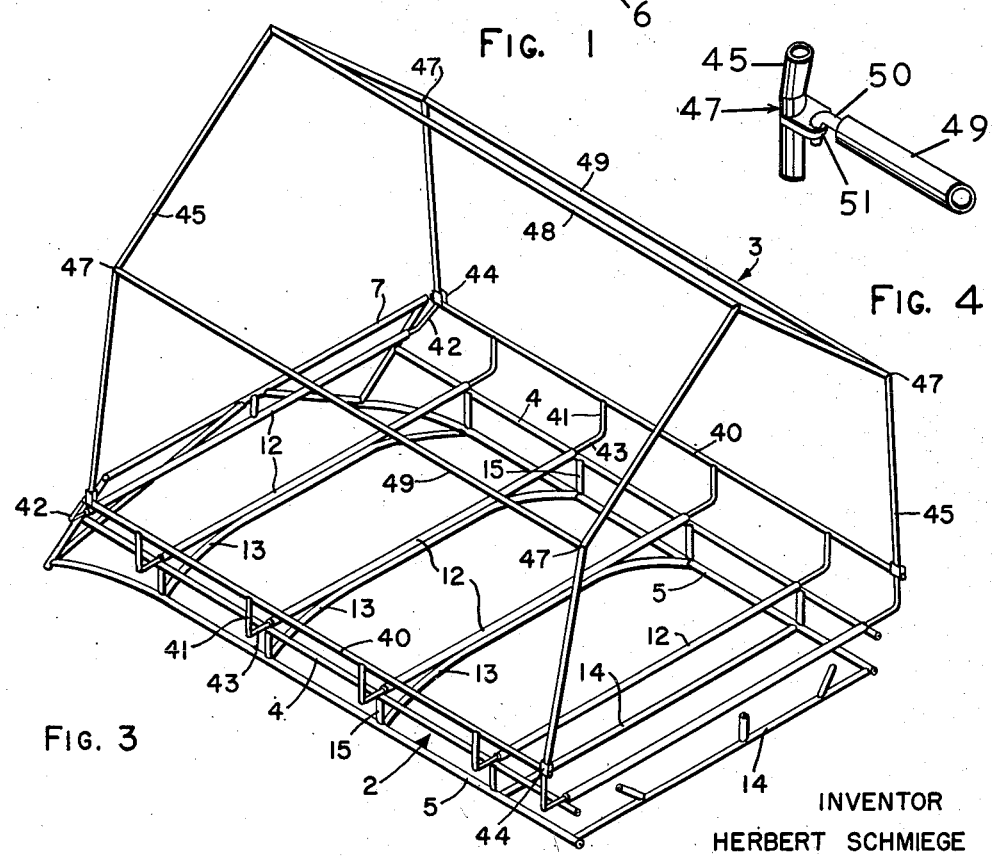
INVENTOR
HERBERT SCHMIEGE
BY Peter P. Price
ATTORNEY

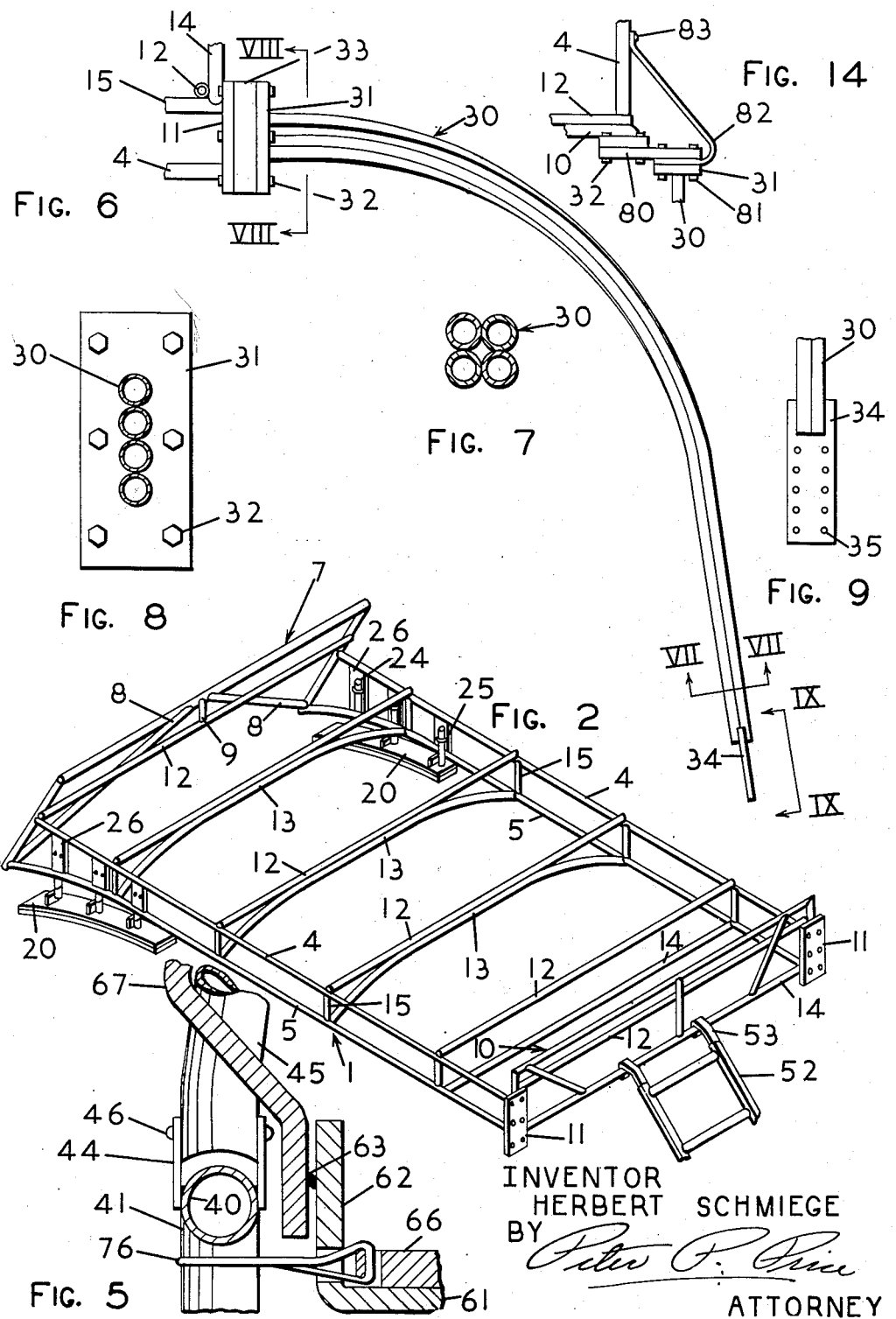

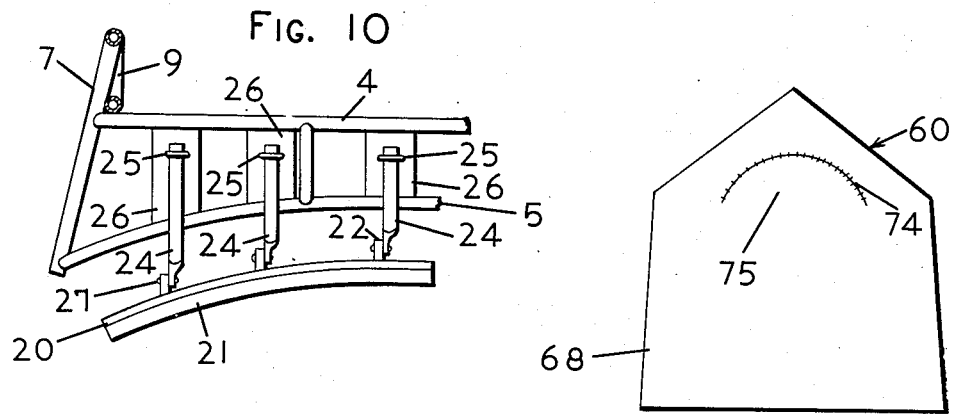
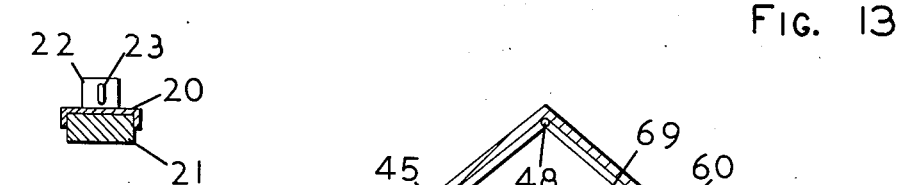
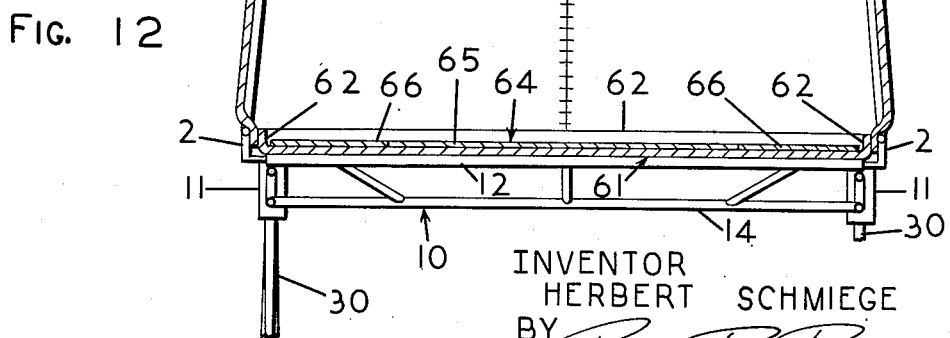

Patented Mar. 2, 1954

2,670,747

UNITED STATES PATENT OFFICE 2,670,747

VEHICLE MOUNTED PORTABLE TENT

Herbert Schmiege, Saginaw, Mich.

Application May 9, 1952, Serial No. 286,864

5 Claims. (Cl. 135—1)

This invention relates to carriers and more particularly to a collapsible tent including the frame therefor, designed to be mounted upon the top of an automobile both while in transit and in use.

My invention is designed to be mounted on the top of an automobile with the front end supported by the roof of the vehicle and the rear end supported by the rear bumper or the supports for the rear bumper. The invention provides certain conveniences not heretofore obtained by any type of camping equipment. By designing the tent structure to be mounted on the top of the vehicle, the entire interior of the vehicle as well as the trunk is freed for the use of other equipment or passengers. By designing my tent to be used while still mounted on the top of the automobile, appreciable time is saved in eliminating the necessity for removing the tent from the vehicle, erecting it and, at the time of departure, remounting it upon the vehicle. My invention also eliminates the time necessary for selecting a suitable, dry camping area as well as much of the equipment necessary to firmly secure the tent during the night.

Tenting equipment is normally heavy and difficult to lift and move. All of this physical exertion is eliminated by my invention. My vehicle mounted tent has the added advantage of being raised sufficiently above the ground that it is never endangered by ground waters or flooding due to excessive rainfall. Also, by being spaced substantially above the ground, it eliminates irritation from ground travelling insects such as ants, woodticks and other outdoor life which are unlikely to scale the sides of a vehicle to enter a tent. My invention is so designed that it may be adapted to the contours and requirements of any make of hardtop, passenger vehicle and the installation and removal of the entire structure is a simple job which can be readily handled by two people.

These and other advantages of my invention will be readily seen by those acquainted with camping equipment upon reading the following specification and the accompanying drawings.

In the drawings:

Figure 1 is a side, elevation view of a vehicle with my tent mounted thereon.

Figure 2 is an oblique view of the base frame for my tent.

Figure 3 is an oblique view of the frame structure for the upper portion of my tent.

Figure 4 is a fragmentary detail of the means for attaching the poles to the uprights of the upper frame structure of my tent.

Figure 5 is an enlarged, detail view of a lower corner of the upper frame structure for my tent.

Figure 6 is a fragmentary, side, elevation view of the rear supporting structure for my tent.

Figure 7 is a sectional view taken along the plane VII—VII of Figure 6.

Figure 8 is a sectional view taken along the plane VIII—VIII of Figure 6.

Figure 9 is a fragmentary, rear view taken along the plane IX—IX of Figure 6.

Figure 10 is a fragmentary, enlarged, side elevation view of the forward end of the base frame for my tent.

Figure 11 is a side, elevation view of the support plate for the forward end of my tent.

Figure 12 is a sectional, elevation view taken along the plane XII—XII of Figure 1.

Figure 13 is a front, elevation view of the tent portion of my invention.

Figure 14 is a fragmentary, plan view of a modified attachment for the rear supports for my invention.

Figure 15 is an enlarged, fragmentary, oblique view of one of the legs of the side frame structure of my invention.

In executing the objects and purposes of my invention, I have provided a complete tent designed to be mounted on the roof of a vehicle. The tent is supported upon a base frame secured at its rearward end to the rear bumper structure of the vehicle and its forward end having a pair of contoured plates designed to rest against the roof surface of the vehicle. The forward end of the frame is equipped with a pair of straps one on each side which extend down the post at each end of the windshield and are anchored to the cowl of the car. To the base frame there is mounted a collapsible tent frame which may be erected to support a canvas tent when the tent is to be used as sleeping quarters and which may be collapsed into a substantially thin package for storage when the vehicle is in motion. The tent is so designed that when the frame is folded down and the tent structure tucked away, the tent encloses the frame and all other metal and wood parts of my invention.

In the following description the terms "forwardly" and "rearwardly" are frequently used and are to be taken to mean "forwardly" in the direction of normal motion of the vehicle, that is, to the left in Figure 1 and "rearwardly" away therefrom. The terms "inwardly" and "outwardly" will be frequently used and are to be taken to mean "inwardly" toward the geometric center of the structure and "outwardly" away therefrom.

Referring specifically to the drawings, the numeral 1 indicates a floor frame (Figure 2), which on each side slidably supports a side frame 2 (Figure 3), which side frames, in turn, mount the collapsible top frame 3. The floor frame includes a pair of top fore and aft members 4 vertically positioned above a pair of lower fore and aft members 5. One upper and one lower fore and aft member are positioned on each side. The forward end of each of the lower fore and aft members 5 is curved downwardly to generally conform with the downward curvature of the forward portion of the roof of the vehicle 6. The side elements composed of the fore and aft members 4 and 5 are joined, at their forward ends, both vertically and transversely by a rearwardly and upwardly inclined framework 7. The upper end of the framework 7 extends substantially above the upper fore and aft members 4. The framework 7 is strengthened by a pair of inclined braces 8 and a vertical post 9. At their rearward ends, the upper and lower fore and aft members 4 and 5 are joined both vertically and transversely by a rear framework 10. Each pair of an upper and lower fore and aft member, at its rearward end, terminates at a vertically arranged rectangular plate 11. Immediately adjacent both the forward framework 7 and the rearward framework 10 and at equally spaced intervals therebetween, floor supporting tubes 12 extend laterally between the upper fore and aft members 4. The tubes are welded to the upper surface of the upper fore and aft members 4. The forward ones of the intermediate floor supporting tubes 12 are braced by means of an arched member 13. The two rearward floor supporting tubes 12 are not provided with arched members but have a lower transverse tube 14 paralleling them between the lower fore and aft members 5. Vertical posts 15 extend between the upper and lower fore and aft members at each of the intermediate, floor supporting tubes 12.

At the forward end of the floor frame are a pair of contoured plates 20, one on each side of the frame (Figures 2, 10 and 11). The contoured plates 20 are shaped to fit the curvature of the forward end of the conventional vehicle. The finish of the vehicle is protected by a resilient pad 21 which also helps to increase the frictional grip between the contour plates and the surface of the vehicle. Each of the contour plates 20 has three upwardly extending ears 22, each of which is provided with a vertically elongated slot 23 (Figure 11). To each of the ears 22 is mounted a vertical rod 24. The rods 24 are each, by means of a U-bolt 25, secured to a plate 26. The plates 26 are mounted to and extend between the upper and lower fore and aft members 4 and 5 at the forward end of the floor frame 1. The lower end of each of the rods 24 is secured to one of the ears 22 by means of a bolt passing through the vertical slot 23. The use of the vertical slot 23 permits the height of the fore and aft ends of the contour plate 20 to be adjusted to secure a snug fit against the top of the vehicle.

The support for the rearward end of the floor frame 1 consists of a pair of arched beams 30 (Figures 1, 6, 7, 8, 9 and 12). At their upper forward end, the arched beams terminate in a vertical plate 31 identical to the vertical plate 11 on the end of the floor frame 1. The vertical plates 11 and 31 are detachably secured together by means of bolts 32. Between the two plates there is normally inserted a spacer 33 (Figure 6). The thickness of the spacer 33 varies from one installation to another, depending upon the make and model of the vehicle. Thus, the spacer serves as a quick and convenient means for adjusting my invention to fit various makes and models of vehicles. The arched beam 30 itself is composed of a plurality of tubes which at their upper forward end are arranged one under the other in a vertical column (Figure 8). The arrangement of these tubes gradually changes until, at the rearward end, they form a square (Figure 7). At its lower rearward end 30, a mounting plate 34 projects beyond the ends of the tubes. A portion of the mounting plate extends upwardly between the two pairs of tubes and is welded thereto. The mounting plate 34 is provided with a number of pairs of mounting holes 35. The use of a plurality of holes 35 permits a certain amount of vertical adjustment of the point of attachment of the mounting plate 34 to the rear bumper of the vehicle. Actual attachment to the rear bumper of the vehicle is effected by means of a bumper gripping clamp such as is conventionally used for towing small trailers but modified to have a plate with holes in it to match the holes 35 in the mounting plate 34.

When my invention is to be mounted on a vehicle of such width that the arched beams 30 must be spaced further apart, the adjustment for this may be accomplished by the use of a pair of wing plates 80 (Figure 14). The wing plates 80 are secured by the bolts 32 to the plate 11 and extend outwardly therefrom to mount the ends of the arched beams 30 by means of the bolts 81. To cover this structure, an ornamental cover plate 82 is used over the outside. The cover plate 82, on one end, seats between the plate 11 and the vertical plate 31. The forward end of the cover plate may be conveniently secured to the fore and aft members 4 and 5 by screws 83.

Mounted to the floor frame 1 are a pair of side frames 2 (Figures 3 and 12). Each of the side frames consists of a main beam 40 mounting a plurality of L-shaped legs 41. The legs 41 depend from the main beam 40 and all except the forward one 42 of the legs 41 are perpendicular to the main beam 40. The forward one 42 of the legs 41 is inclined forwardly to match the forward inclination of the framework 7. Each of the legs 41 has an inwardly extending arm 43 which is telescopically received into one of the floor supporting tubes 12. Thus, the spacing of each of the side frames 2 from the center of the carrier is adjustable for purposes which will appear more fully hereinafter. At both their forward and rearward ends each of the main beams 40 mounts a pair of plates which, together with the main beam, forms a U-shaped clip 44 serving as one-half of the hinge by which the top frame 3 is secured to the side frames 2.

The top frame 3 (Figure 3) includes a pair of end arches 45 each of which, on each of its lower ends, is pivotally secured to one of the U-shaped clips 44 by means of a pin 46 (Figure 5). The arches 45 are each made of tubular material and are hipped at 47 midway up their sides whereby they come to a pointed, top apex. The end arches 45 are of sufficient strength to support the hereinafter described tent but are flexible enough to be spread or closed slightly as the side frames 2 are moved toward or away from each other. At the top apex, the end arches 45 are joined by a ridge pole 48. At each of the hip points 47 the end arches are joined by a hip pole 49. The ridge pole 48 and hip poles 49, at each of their ends, are equipped with a hook 50 (Figure 4). The hooks 50 are designed to engage a hole in the lugs 51 mounted to the end arches 45. One lug is mounted at the apex of each of the end arches, and one lug at each of the hip points 47 of each of the end arches. Thus, the ridge pole 48 and hip poles 49 are each made quickly and readily removable when the tent is to be collapsed.

Access to the tent is provided by means of a ladder 52 (Figures 1 and 2). The upper end of the ladder is provided with a pair of hooks 53 for engaging the rearward framework 10. The lower portion of the ladder bears against the rear bumper of the vehicle. Where the ladder passes close to the body of the vehicle it is provided with a step-shaped shield 54 to guard against damage to the vehicle's finish. When the vehicle is in motion and the ladder is not in use, it is stored within the floor frame 1 between the floor-supporting tubes 12 and the lower lateral members 14.

The tent portion of my invention consists primarily of two parts, a top unit 60 and a floor unit 61 (Figure 12). The floor unit is designed to fit between the side frames 2 and the forward framework 7 and rearward framework 10. Along both its forward and rearward ends and along its sides it is turned up to form an upwardly extending peripheral flange 62. Adjacent the upper end of the flange and extending entirely around the tent is a separable slide fastener 63 (Figure 5). The separable slide fastener 63 provides a substantially airtight joint between the floor unit 61 and the top unit 60 of the tent. Seated within the cup formed by the sides 62 of the floor unit 61 is a board floor 64 consisting of a wide central portion 65 and a pair of relatively narrow side portions 66. The side portions 66 are designed to be lifted and slipped over the central portion 65 when the side frames 2 are pushed together and the tent stored for transportation. The floor 64 provides a rigid support for sleeping equipment such as a mattress or a sleeping bag.

The top unit 60 of the tent consists of a main roof portion 67 which includes the sides and a forward end 68 and a rearward end 69. The top unit 60 of the tent seats over and encases the top frame 3 except at the lower extremities where it is provided with a hole at each corner to permit the bottoms of the end arches 45 to pass therethrough. Along its lower edge the top portion unit 60 of the tent extends inwardly of the side frames 2 and then extends downwardly on the outside of the side flanges 62 of the floor unit 61 of the tent. It is at this point joined to the floor unit 61 by means of the slide fastener 63. By overlapping the bottom of the top unit 60 on the outside of the side flanges 62 of the floor unit 61, the entrance of moisture into the tent is prevented. The top unit 60 of the tent is not attached to the top frame but the side flanges 62 of the floor unit 61 are tied at certain points to the legs 41 of the side frames 2. Likewise, the side portions 66 of the wooden floor are, at each corner of the tent, tied to the legs 41 of the side frames 2 by means of a cord 76 (Figure 5).

The rearward end 69 of the top unit 60 is provided with flaps 70 designed to be used as access to the interior of the tent (Figure 12). The flaps 70 are secured by a vertical slide fastener 71 at the center of the rearward end 69 and a top slide fastener 72. The slide fastener 72 extends in an arc across the top of the flaps 70 with one-half the slide fastener arranged on each side of the vertical slide fastener 71. The forward end 68 of the tent is provided, in its upper portion, with a semi-circular slide fastener 74 whereby a flap 75 may be opened for cross-ventilation, when desired (Figure 13).

The frame structure of my invention is made from any suitable material such as steel or aluminum. Where strength permits, aluminum is a preferred material because of its corrosion resistance and its light weight. The tent portion of my invention is prefereably made of a fabric, normally a heavy weight, waterproofed duck. It is within the purview of my invention that other materials having satisfactory water repellant and wearing qualities be substituted for the waterproofed duck. The various seams in the tent portion, not joined by one of the slide fasteners, are sewn together to provide a water tight joint.

*Operation*

My invention is designed to be mounted as a unit upon the vehicle at the beginning of the trip on which it is to be used, and thereafter it will only be removed when the trip is complete and it is no longer needed. Although it may be mounted upon the car in several separate assemblies, it is primarily designed to be mounted on the car as a complete unit in its collapsed and stored condition.

When first mounted on the vehicle, it is lifted to the top of the car and then, with its front end loosely supported by the contour plates 20 and its rearward end supported in any convenient manner such as manually or by a rope from a garage ceiling, the arched beams 30 are attached. At this time the particular thickness of spacer 33 suitable for the make and model of car on which the unit is to be mounted is selected. Also the wing plates 80, if needed, are added. The bolts 32 are then put in place and tightened to rigidly secure the arched beams 30 to the floor frame 1. The bumper clamps having previously been put in place, are now adjusted to align with the ends of each of the arched beams 30 and tightened to the bumper. By means of bolts, the mounting plates 34 on the lower ends of the arched beams 30 are secured to the bumper clamps. The attaching bolts are passed through those of the holes 35 which support the floor frame 1 in a level position.

Once the back has been attached, the bolts 27 securing the rods 24 to the ears 22 are loosened to permit the contour plates 20 to be adjusted to the general contour of the vehicle. These bolts 27 are then tightened and the U-bolts 25 loosened to permit the forward end of the floor frame 1 to be raised or lowered with respect to the roof of the vehicle. This permits the frame to be properly spaced from the vehicle roof and the frame to be levelled. Once this has been accomplished, the U-bolts are tightened securely. After these adjustments have been made, the trim plates 28 are attached over the structure holding the contour plates 20. The trim plates do not serve any structural purpose, merely improving the external appearance of the completed structure. The front end of the floor frame 1 is then secured to the vehicle by a strap 29 attached to each forward corner of the floor frame. The straps 29 each extend down one of the corner posts of the windshield of the vehicle and are anchored to the cowl of the car beneath the hood. The anchorage to the cowl is made in such a way that the strap will not pull against the hood injuring the vehicle's finish. The straps 29 prevent the whole structure from lifting off the car due to wind resistance when the car is in motion; the contour plates 21 provide support for the weight of the forward end of the structure while the arched beams 30 both support the weight of the rearward end of the structure and hold the structure against rearward movement both while the vehicle is in motion and due to the movement of people within the unit when it is being used as a tent.

The contour plates are but one means which may be used to support the forward end of the floor frame 1 on the vehicle. A semi-rigid, contoured beam may be substituted for these plates extending transversely of the vehicle. Such a beam may be made to conform to the vehicle's contour because of its semi-rigidity under the weight of the tent and the downward pull of the straps 29.

Once the unit has been securely mounted to the car, the tent may be erected. The tent itself, in stored position, is folded down into the lower framework to provide a vertically thin, compact unit, offering a minimum of air resistance when the vehicle is in motion. The stored tent is covered by a water repellant, fabric or plastic cover entirely covering the top of the tent. The edges of the cover extend downwardly over the sides of the frame. This cover is secured to the frame by a rope running through eyelets in the side of the cover and looping tightly under each of the fingers 94 on the legs 41 of the side frames 40. The fingers 94 are, on one end, welded to the legs 41 with their free ends projecting downwardly and outwardly from the legs (Figures 3 and 15). The roping down of the cover holds the cover in place and keeps it taut whereby it will not collect pools of water. To raise this tent, the cover is removed and the tent loosened from the floor framework. The tent is then raised until the end arches 45 may be pivoted into their raised position. With the arches held upright, the ridge pole 48 and the hip poles 49 are put in place by hooking their ends into the lugs 51. This secures the end arches 45 against collapse and securely supports the top unit 60 of the tent. During the raising process, the flap 70 must be open to give access to the interior of the tent. After the tent has been raised, the side frames are pulled outwardly to extend the tent floor to its full width. This permits the side portions 66 of the floor 64 to be pushed outwardly until they seat beside the central portion 65. The tent is now fully erected and may be used by placing a mattress on the floor 64 or using the floor as a support for sleeping bags. The tent is so designed that it will comfortably sleep from one to three persons. To maintain the side portions 66 in proper position they are tied by means of the strings 76 at each end to the legs 41 of the side frames 2.

Since the whole lower portion of the tent remains a fixed installation on the vehicle, no time is lost in erecting or assembling a floor structure. The floor structure, including its enclosing fabric is ready for use at any time requiring only the adjustment of the side frames 2 and the placing of the side portions 66 of the floor. The same is true when the tent is stored for the day. This represents an appreciable saving in time and effort.

When erected, the tent is secure against cold wind, insects or moisture. When ventilation is needed, the slide fasteners 74 and 72 may be opened as far as necessary to provide the desired air openings. These openings, when necessary, may be covered by insect screening.

When the tent is collapsed for transportation, the ridge pole 48 and hip poles 49 are laid on the floor of the tent and the end arches 45 are folded inwardly, one over the other, to give the stored unit a thin, flat contour. If desired, the mattress or sleeping bags may be left within the folded tent ready for use when the tent is next erected. It is thus seen that the tent may be rapidly erected and collapsed, substantially reducing the time normally necessary to make camp. At the same time, all the necessary equipment for providing secure sleeping quarters is carried in a single unit, compactly stored without interference with the rest of the vehicle.

Various modifications of my invention may be made without departing from the principle thereof. Each of these modifications is to be considered as included in the hereinafter appended claims unless these claims by their language expressly provide otherwise.

I claim:

1. In a portable tent adapted to be mounted on the top of a vehicle having a rigid roof and a rear bumper, the combination including: a floor frame; means for anchoring the forward end of said floor frame to the forward end of said vehicle; a contoured support at the forward end of said floor frame, said contoured support adapted to seat upon the forward portion of said rigid roof; a pair of beams extending rearwardly and downwardly from the rearward end of said floor frame; means for attaching one end of each of said beams to the rear bumper of said vehicle; a pair of side frames mounted to said floor frame; one on each side thereof; a flexible water repellant sheet seated on said floor frame between said side frames and extending substantially the full length of said floor frame; said sheet having an upwardly extending peripheral flange therearound; a rigid floor seated on said sheet within said peripheral flange; an upwardly extending collapsible frame; a flexible water repellant canopy enclosing said collapsible frame; means detachably securing the lower end of said canopy to said peripheral flange of said sheet.

2. A portable tent as described in claim 1 wherein said floor frame has a plurality of spaced, parallel, transverse, tubular members; said pair of side frames being disposed, one on each side of said floor frame; each of said side frames having a plurality of L-shaped legs; one end of each of said legs being telescopically and slidably received in one end of one of said tubular members.

3. A portable tent as described in claim 1 wherein said floor frame has a plurality of spaced, parallel, transverse, tubular members; said pair of side frames being disposed, one on each side of said floor frame; each of said side frames having a plurality of L-shaped legs; one end of each of said legs being telescopically and slidably received in one end of one of said tubular members; said rigid floor being divided into a central portion and a pair of side portions adapted to slide over said central portion when said side frames are pushed toward each other.

4. In a portable tent adapted to be mounted on the top of a vehicle having a rigid roof and a rear bumper, the combination including: a floor frame; means for anchoring the forward end of said floor frame to the forward end of said vehicle; a contoured support at the forward end of said floor frame, said contoured support adapted to seat upon the forward portion of said rigid roof; a pair of beams extending rearwardly and downwardly from the rearward end of said floor frame; a spacer between said floor frame and each of said beams, said spacer being one of a plurality of thicknesses selected to compensate for variable lengths of vehicles; means for attaching one end of each of said beams to the rear bumper of said vehicle; a pair of side frames mounted to said floor frame, one on each side thereof; a flexible water repellant sheet seated on said floor frame between said side frames and extending substantially the full length of said floor frame; said sheet having an upwardly extending peripheral flange therearound; a rigid floor seated on said sheet within said peripheral flange; an upwardly extending collapsible frame mounted to said side frames; a flexible water repellant canopy enclosing said collapsible frame; means for detachably securing the lower end of said canopy to said peripheral flange of said sheet.

5. In a portable tent adapted to be mounted on the top of a vehicle having a rigid roof and a rear bumper, the combination including: a floor frame; means for anchoring the forward end of said floor frame to the forward end of said vehicle; a contoured support at the forward end of said floor frame, said contoured support adapted to seat upon the forward portion of said rigid roof; a pair of beams extending rearwardly and downwardly from the rearward end of said floor frame; means for attaching one end of each of said beams to the rear bumper of said vehicle; a pair of side frames mounted to said floor frame, one on each side thereof; a flexible water repellant sheet seated on said floor frame between said side frames and extending substantially the full length of said floor frame; said sheet having an upwardly extending peripheral flange therearound; a rigid floor seated on said sheet within said peripheral flange; a collapsible frame including an upwardly extending arch mounted at each end of said side frames for pivotal movement from a vertical to a substantially horizontal position; a plurality of detachably mounted poles secured to and between said end frames; a flexible water repellant canopy enclosing said collapsible frame both when erected and when collapsed, said canopy and said collapsible frame, in stored condition being received within said side frames as a relatively thin rectangular unit.

HERBERT SCHMIEGE.

References Cited in the file of this patent

UNITED STATES PATENTS

| Number | Name | Date |
| --- | --- | --- |
| 2,186,584 | Halvrsen | Jan. 9, 1940 |
| 2,222,636 | Strauss | Nov. 26, 1940 |
| 2,291,900 | Jimmes | Aug. 4, 1942 |
| 2,561,168 | Beckley | July 17, 1951 |